United States Patent
Hsieh (10) Patent No.: US 11,862,050 B2
(45) Date of Patent: *Jan. 2, 2024

(54) FLEXIBLE DISPLAY DEVICE AND MANUFACTURING METHOD THEREOF

(71) Applicant: AUO Corporation, Hsinchu (TW)

(72) Inventor: Kun-Lung Hsieh, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,842

(22) Filed: Feb. 15, 2023

(65) Prior Publication Data

US 2023/0196950 A1 Jun. 22, 2023

Related U.S. Application Data

(63) Continuation of application No. 16/897,283, filed on Jun. 10, 2020, now Pat. No. 11,605,314.

(60) Provisional application No. 62/878,857, filed on Jul. 26, 2019.

(30) Foreign Application Priority Data

Jan. 20, 2020 (TW) ................. 109101945

(51) Int. Cl.
*G09F 9/30* (2006.01)
*B32B 7/12* (2006.01)

(52) U.S. Cl.
CPC ............... *G09F 9/301* (2013.01); *B32B 7/12* (2013.01)

(58) Field of Classification Search
CPC ................... G09F 9/301; B32B 7/12
See application file for complete search history.

*Primary Examiner* — Cynthia L Schaller
(74) *Attorney, Agent, or Firm* — JCIPRNET (57) ABSTRACT

A flexible display device includes a base film, a display panel on the base film, a protective film on a surface of the display panel away from the base film, and an adhesive layer. An area of the protective film is less than that of the display panel. The adhesive layer and the protective film has an overlapping portion. The adhesive layer has a thickness and Young's modulus between 10 and 500 μm and between 0.1 and 10 GPa, respectively. A side edge of the base film, a side edge of the display panel, and a side edge of the adhesive layer are substantially aligned.

17 Claims, 7 Drawing Sheets

FLEXIBLE DISPLAY DEVICE AND MANUFACTURING METHOD THEREOF

CROSS-REFERENCE TO RELATED APPLICATION

This application is a continuation application of and claims the priority benefit of a prior application Ser. No. 16/897,283, filed on Jun. 10, 2020. The prior application Ser. No. 16/897,283 claims the priority benefit of U.S. provisional application Ser. No. 62/878,857, filed on Jul. 26, 2019, and Taiwan application serial no. 109101945, filed on Jan. 20, 2020. The entirety of each of the above-mentioned patent applications is hereby incorporated by reference herein and made a part of this specification.

BACKGROUND

1. Technical Field

The disclosure relates to a display device and a manufacturing method thereof, and in particular, to a flexible display device and a manufacturing method thereof.

2. Description of Related Art

Generally, some components and film layers in a flexible display device exhibit certain hardness and brittleness properties. As such, when the flexible display device in a flexure or bending state, a structural fracture may be generated due to a bending stress, and internal components may thus be damaged. Therefore, how to reduce adverse effects of the bending stress on flexible display devices and prolong the service life of the flexible display devices has become a problem to be urgently solved at present.

SUMMARY

The disclosure is directed to a flexible display device and a manufacturing method thereof, which can reduce adverse effects of a bending stress on the flexible display device and prolong the service life of the flexible display device.

The disclosure provides a flexible display device including a base film, a display panel, a protective film, and an adhesive layer. The display panel is located on the base film. An area of the base film is substantially identical to an area of the display panel. The protective film is located on a surface of the display panel away from the base film. An area of the protective film is less than the area of the display panel. The adhesive layer is located on the surface of the display panel away from the base film, and the adhesive layer and the protective film include an overlapping portion. A thickness of the adhesive layer is between 10 μm and 500 μm. A Young's modulus of the adhesive layer is between 0.1 GPa and 10 GPa. A side edge of the base film, a side edge of the display panel, and a side edge of the adhesive layer are substantially aligned.

The disclosure further provides a manufacturing method of a flexible display device, and the manufacturing method includes the following steps. A display panel is disposed on a base film. A protective film is disposed on a surface of the display panel away from the base film, where an area of the protective film is less than an area of the display panel. An adhesive layer is formed on the surface of the display panel away from the base film, and the adhesive layer and the protective film include an overlapping portion. A thickness of the adhesive layer is between 10 μm and 500 μm. A Young's modulus of the adhesive layer is between 0.1 GPa and 10 GPa. A laser cutting process is performed to make a side edge of the base film, a side edge of the display panel, and a side edge of the adhesive layer substantially aligned.

In order to make the aforementioned and other features and advantages of the disclosure comprehensible, embodiments accompanied with figures are described in detail below.

DESCRIPTION OF THE EMBODIMENTS

Multiple implementations of the disclosure are disclosed below with figures. Many practical details are explained in the following statements for clarification. However, it should be understood that the practical details should not be used to limit the disclosure. That is, the practical details are unnecessary in some implementations of the disclosure. In addition, in order to simplify the figures, some conventional structures and elements are omitted or simply illustrated in the figures.

Identical reference numerals represent identical or similar elements throughout the specification. In the accompanying drawings, thicknesses of layers, films, panels, regions, and so on are enlarged for clarity. It should be understood that when an element such as a layer, a film, a region, or a substrate is referred to as being "on" or "connected to" another element, it may be directly on or connected to the another element, or there may be other elements between the element and the another element. In contrast, when an element is referred to as being "directly on another element" or "directly connected to" the another element, there are no other elements between the element and the another element. As used herein, "connected" may mean being physically and/or electrically connected. Furthermore, two elements being "electrically connected" or "coupled" may mean that there are other elements between the two elements.

The terms used herein are only intended to describe specific embodiments of the disclosure, but are not intended to limit the disclosure. For example, "a/an," "one," and "the" used herein are not intended to limit an element to a singular or plural form. The term "or" used herein indicates "and/or." As used herein, the term "and/or" includes any and all combinations of one or more associated items listed. It should also be understood that, when used in the specification, the term "include" or "comprise" specifies the existence of the feature, the region, the whole, the step, the operation, and the element and/or member, but does not exclude the existence or addition of one or more other features, regions, wholes, steps, operations, elements, members and/or combinations thereof.

In addition, relative terms such as "lower" or "bottom" and "upper" or "top" may be used herein to describe a relationship between an element and another element, as shown in the figures. It should be understood that the relative terms are intended to include different orientations of a device in addition to the orientations shown in the figures. For example, if a device in a figure is flipped, an element described as being on a "lower" side of another element is oriented to an "upper" side of the another element. Therefore, the exemplary term "lower" may include "lower" and "upper" orientations, depending on a specific orientation of the figure. Similarly, if a device in a figure is flipped, an element described as being "below" another element or "below" is oriented to being "above" the another element. Therefore, the exemplary term "above" or "below" may include up and down orientations.

The term "about" or "substantially" used herein includes the value and an average value within an acceptable deviation range of specific values determined by a person of ordinary skill in the art, taking into account discussed measurements and a specific number of measurement-related errors (i.e., limitations of a measuring system). For example, the term "about" may mean being within one or more standard deviations of the value, or within, for example, ±30%, ±20%, ±10%, and ±5%. Moreover, the term "about" or "substantially" used herein may mean selecting a more acceptable deviation range or standard deviations according to measurement properties, cutting properties or other properties, without applying a single standard deviation to all properties.

Unless otherwise defined, all the terms used herein (including technical and scientific terms) have the same meaning as is commonly understood by a person of ordinary skill in the art. It should further be understood that terms such as those defined in commonly used dictionaries shall be interpreted as having meanings consistent with their meanings in the related art and the context of the disclosure and shall not be interpreted as having an idealized or overly formal meaning, unless so defined explicitly herein.

FIG. 1A to FIG. 1D are partial cross-sectional views of a flexible display device at different stages of a manufacturing process according to an embodiment of the disclosure. In the present embodiment, a manufacturing method of a flexible display device 100 may include the following steps.

Figure 1A:
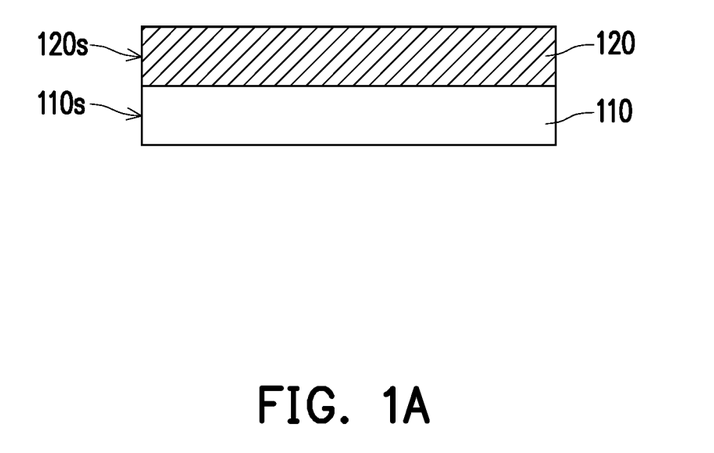
FIG. 1A to FIG. 1D are partial cross-sectional views of a flexible display device at different stages of a manufacturing process according to an embodiment of the disclosure.

Referring to FIG. 1A, a display panel 120 is disposed on a base film 110. It should be noted that an area of the base film 110 in FIG. 1A may be substantially identical to an area of the display panel 120. Nevertheless, the disclosure is not limited thereto. Before a subsequent laser cutting process is performed, the area of the base film 110 may be different from that of the display panel 120.

In the present embodiment, the base film 110 and the display panel 120 may be flexible. For example, a material of the base film 110 may be a plastic film, a metal film, or a combination thereof. The plastic film may have a support function, and the metal film may improve flatness of the base film 110. The plastic film is, for example, a plastic material such as polyethylene terephthalate (PET), polyimide (PI), or polyethylene naphthalate (PEN), or other flexible polymers, but the disclosure is not limited thereto. The metal film is, for example, a stainless steel foil, a copper foil, or an aluminum foil, but the disclosure is not limited thereto.

The display panel 120 may be composed of a flexible substrate, a plurality of elements formed on the flexible substrate, a color filter, and a polarizer, but the disclosure is not limited thereto. For example, the flexible substrate is, for example, a glass substrate, a plastic substrate, a metallic soft substrate, or a multi-layer composite substrate composed of the above materials. The plurality of elements may include a driving element that may be, for example, a plurality of thin film transistors (TFTs), a passive element, a touch element, or a corresponding wire (e.g., a scan line, a data line, or other similar signal lines), and a light-emitting element such as an organic light emitting diode (OLED), a thin film encapsulation (TFE), a micro LED, or a mini LED. The color filter includes a flexible transparent substrate, a black matrix, an RGB color layer, etc. The polarizer is, for example, a circular polarizer.

Figure 1B:
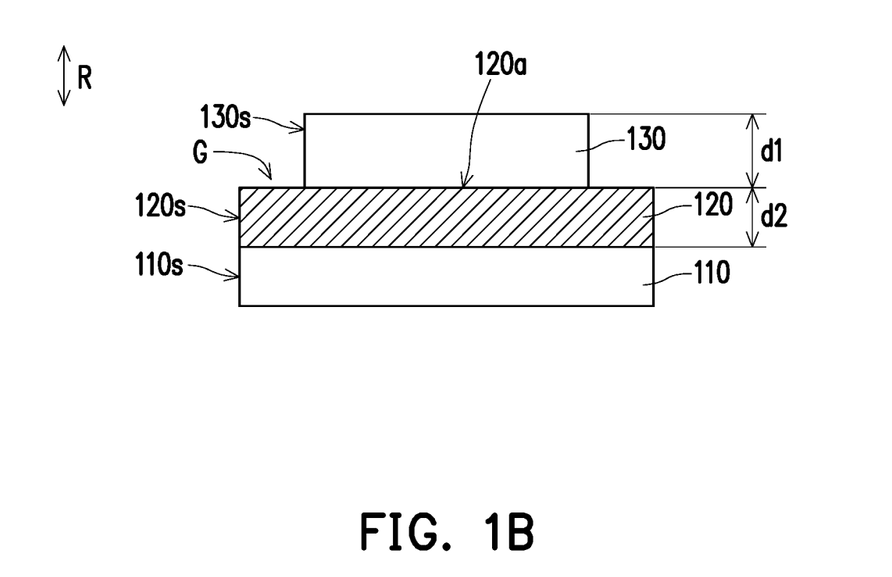

Referring to FIG. 1B, a protective film 130 is disposed on a surface 120a of the display panel 120 away from the base film 110, where an area of the protective film 130 is less than that of the display panel 120. In other words, the display panel 120 is located between the base film 110 and the protective film 130, the protective film 130 is indented towards the display panel 120 and exposes part of the display panel 120 to form a region G not covered by the protective film 130 between a side edge 120s of the display panel 120 and a side edge 130s of the protective film 130. In this way, the protective film 130 is ensured not to be cut during subsequent cutting of the display panel 120. Further, formation of micro cracks at the side edge 130s of the protective film 130 due to the cutting and further the micro cracks propagation under repeated bending are prevented from occurring. Moreover, in the case that the protective film 130 is expensive, the region G not covered by the protective film 130 is a cutting tolerance range, so that manufacturing costs generated by losses of the protective film 130, the display panel 120, and the base film 110 caused by the cutting may be further reduced.

In the present embodiment, in order to effectively protect the display panel 120, a thickness d1 of the protective film 130 may be greater than a thickness d2 of the display panel 120, and surface hardness of the protective film 130 may be greater than surface hardness of the display panel 120 and surface hardness of the base film 110, but the disclosure is not limited thereto. Herein, a thickness direction is a stack direction R in which the base film 110, the display panel 120, and the protective film 130 are sequentially stacked. A method for disposing the display panel 120 and the protective film 130 is not limited in the disclosure and may be determined according to actual design needs.

Figure 1C:
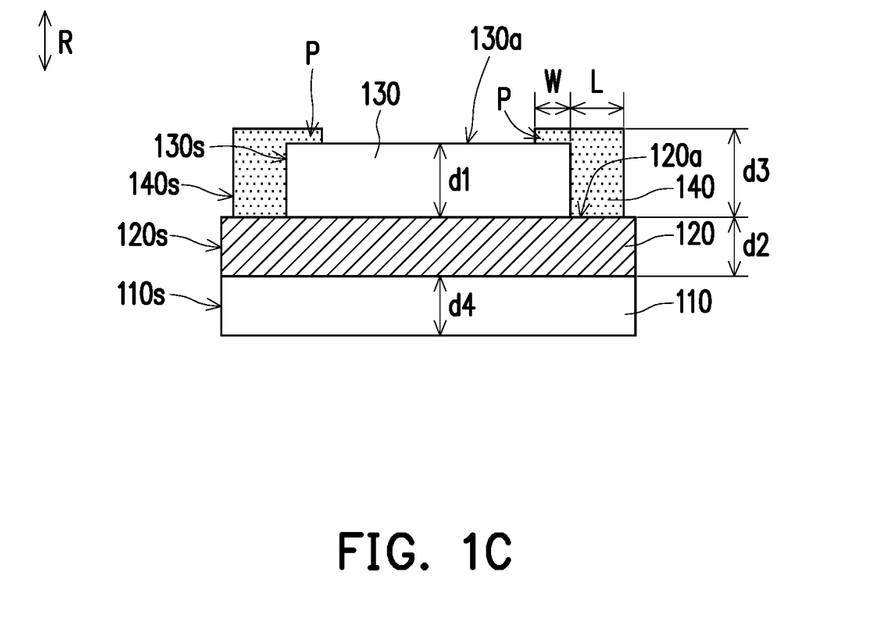

Referring to FIG. 1C, an adhesive layer 140 is formed on the surface 120a of the display panel 120 away from the base film 110, and the adhesive layer 140 and the protective film 130 include an overlapping portion P. For example, the adhesive layer 140 and the protective film 130 include the overlapping portion P in the stack direction R. In other words, the overlapping portion P between the adhesive layer 140 and the protective film 130 covers part of a top surface 130a of the protective film 130, and the other part of the top surface 130a of the protective film 130 is exposed. The adhesive layer 140 may extend from the side edge 130s of the protective film 130 to the top surface 130a of the protective film 130. In this way, the side edge 130s of the protective film 130 may be well protected, and an edge may not be damaged by a collision. The adhesive layer 140 is formed by, for example, coating.

In the present embodiment, a thickness d3 of the adhesive layer 140 is between 10 μm and 500 μm, and a Young's modulus of the adhesive layer 140 is between 0.1 GPa and 10 GPa. Therefore, through parameter setting of the thickness and the Young's modulus of the adhesive layer 140, protection of a wiring line in the region G not covered by the protective film 130 of the flexible display device 100 is enhanced, and a position of a neural axis of the region G not covered by the protective film 130 of the flexible display device 100 may also be dynamically adjusted. In this way, a wire line on an edge of the display panel 120 may not be fractured when being affected by repeated bending, adverse effects of a bending stress on the flexible display device 100 may be further reduced, and the service life of the flexible display device 100 is thereby prolonged.

For example, the parameter setting of the thickness and the Young's modulus of the adhesive layer 140 may be adjusted according to overall stiffness of the display panel 120 and the base film 110. The neural axis of the flexible display device 100 may thereby be located in a region of the display panel 120 closer to the driving element and the light-emitting element to prevent the driving element and the light-emitting element from being damaged due to an excessive bending stress. As such, adverse effects of the bending stress on the flexible display device 100 are reduced, and the service life of the flexible display device 100 is prolonged. Herein, the stiffness is a product of the Young's modulus and the thickness. Further, if the display panel 120 is composed of a flexible lower substrate, a driving element, a light-emitting element, a touch element, and a color filter (including a flexible transparent upper substrate), stiffness of the flexible lower substrate in the display panel 120 plus stiffness of the base film 110 may approximately equal to stiffness of the flexible transparent upper substrate in the display panel 120 plus stiffness of the adhesive layer 140. The stiffness of the flexible lower substrate in the display panel 120 may be designed to be the same as that of the flexible transparent upper substrate, so that the driving element and the light-emitting element are closer to the neutral axis of the display panel 120. Moreover, the thickness d3 of the adhesive layer 140 may be approximately greater than or equal to a thickness d4 of the base film 110. Therefore, the Young's modulus of the adhesive layer 140 may be less than or equal to the thickness d4 of the base film 110, so that the neural axis of the flexible display device 100 may fall within a region close to a region provided with a plurality of elements (such as the driving element and the light-emitting element) in the display panel 120. Adverse effects (e.g., a fracture in the wire line in the region due to bending) of the bending stress on the elements are reduced, and the service life of the flexible display device 100 is prolonged. In an embodiment, if the base film is a composite material, for example, PET and a stainless steel foil bonded by an adhesive, the position of the neutral axis may not be calculated by linear addition and subtraction of stiffness, and the neutral axis needs to be calculated by simulation, so design is still required to be made according to actual needs.

In the present embodiment, the overlapping portion P may include the side edge 130s of the protective film 130. In other words, the overlapping portion P may extend from the side edge 130s of the protective film 130 towards the middle. A width W of the overlapping portion P may be between 10 μm and 1,000 μm, and a distance L between the side edge 130s of the protective film 130 and the side edge 140s of the adhesive layer 140 may be between 100 μm and 1,000 μm. With the setting of the above parameters, the protective film 130 is not cut when the display panel 120 and the base film 110 are cut. The side edge 130s of the protective film 130 is thereby effectively protected, and the formation of micro cracks on the protective film 130 due to lateral impact and the micro cracks propagation under repeated bending are prevented. Besides, in addition to effectively adjusting the position of the neural axis of the flexible display device 100 and further reducing adverse effects of the bending stress on the flexible display device 100, the adhesive layer 140 may also provide protection over the wire line in the region G not covered by the protective film 130 of the flexible display device 100. In particular, the flexible display device 100 may also be designed to have a narrow border in the trend concerning the screen-to-body ratio of a narrow border to a large screen in the future. The border may be a region defined by the distance L.

Figure 1D:
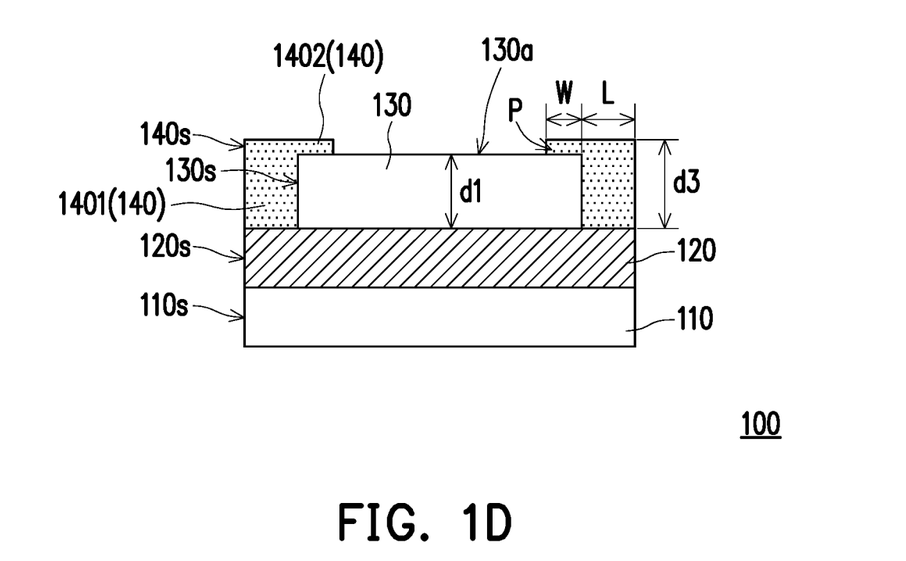

Referring to FIG. 1D, after the adhesive layer 140 is formed, a laser cutting process is performed to make a side edge 110s of the base film 110, a side edge 120s of the display panel 120, and a side edge 140s of the adhesive layer 140 substantially aligned. In this way, dust is prevented from accumulating on the region G as shown in FIG. 1B to damage the display panel 120. In other words, after the laser cutting process is performed, the area of the base film 110 may be substantially the same as that of the display panel 120. In the present embodiment, the top surface 130a of the protective film 130 acts as a boundary. After the laser cutting process is performed, the adhesive layer 140 may be divided into a vertical portion 1401 and a horizontal portion 1402. The vertical portion 1401 is close to the display panel 120, and the vertical portion 1401 is connected to the display panel 120 and the horizontal portion 1402. The vertical portion 1401 and the horizontal portion 1402 have different thicknesses and widths. As shown in FIG. 1D, the width of the vertical portion 1401 may be equal to the distance L, and the thickness of the vertical portion 1401 may be equal to the thickness d1 of the protective film 130. The width of the horizontal portion 1402 may be equal to a sum of the distance L and the width W of the overlapping portion P, and the thickness of the horizontal portion 1402 may be equal to a difference value between the thickness d3 of the adhesive layer 140 and the thickness d1 of the protective film 130.

In an embodiment, the adhesive layer 140 may be a black adhesive layer. In this way, a user is prevented from tearing the protective film 130 by mistake, and that the protective film 130 may not be stripped from the display panel 120, and the service life of the flexible display device 100 is thereby prolonged. On the other hand, the protective film 130 may include an inorganic material layer. The inorganic material layer may include thin glass. For example, the thin glass may be reinforced thin glass, but the disclosure is not limited thereto. In other embodiments, the protective film 130 may have be implemented differently.

It should be noted herein that the following embodiment follows the element reference numerals and some content in the embodiment of FIG. 1A to FIG. 1D, where identical or similar reference numerals are used to represent identical or similar elements, and the description of identical technical content is omitted. Reference can be made to the above embodiment for the description of the omitted content, and the description thereof is not repeated in the following embodiment.

Figure 2A:
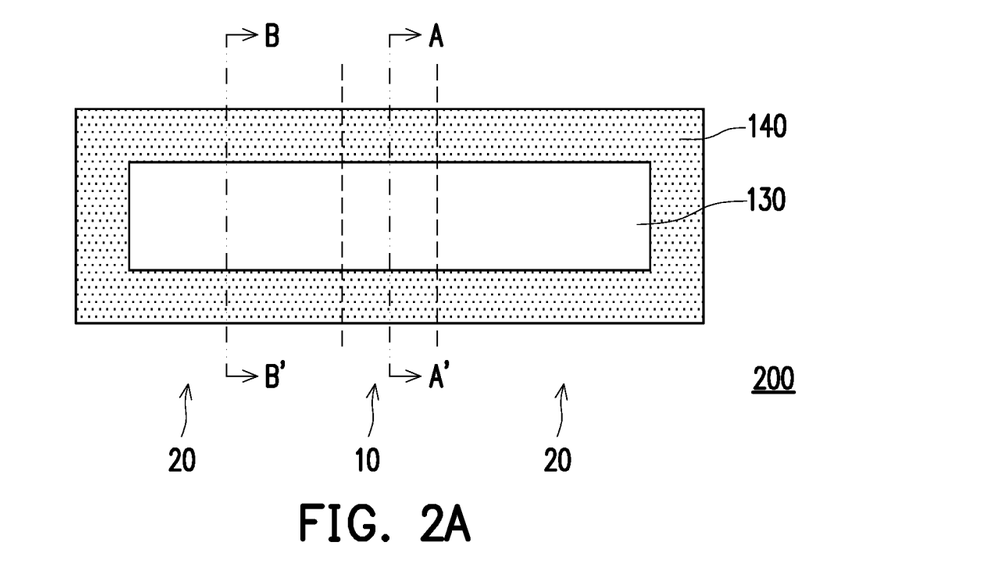
FIG. 2A is a partial top view of a flexible display device according to another embodiment of the disclosure.
Figure 2B:
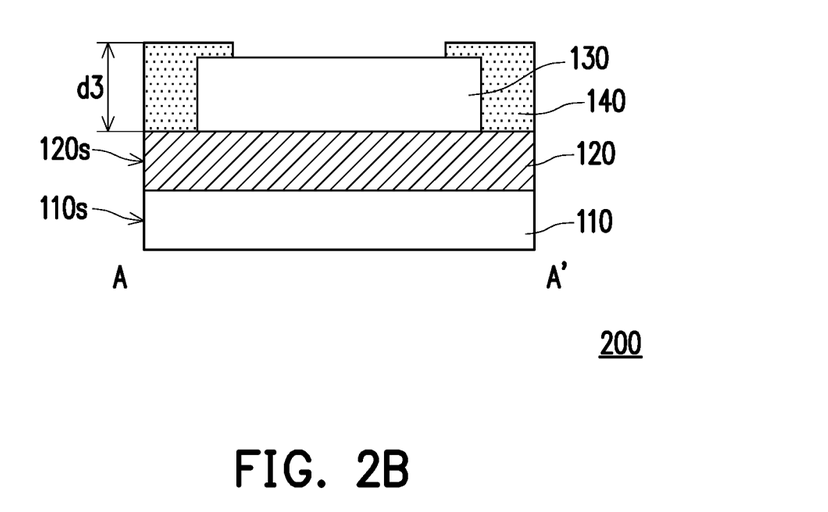
FIG. 2B is a partial cross-sectional view along a line A-A' in FIG. 2A.
Figure 2C:
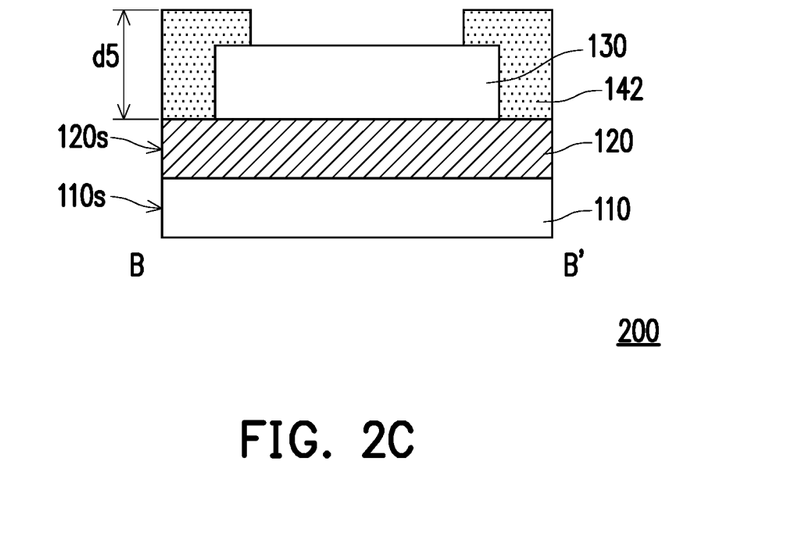
FIG. 2C is a partial cross-sectional view along a line B-B' in FIG. 2A.
Figure 3A:
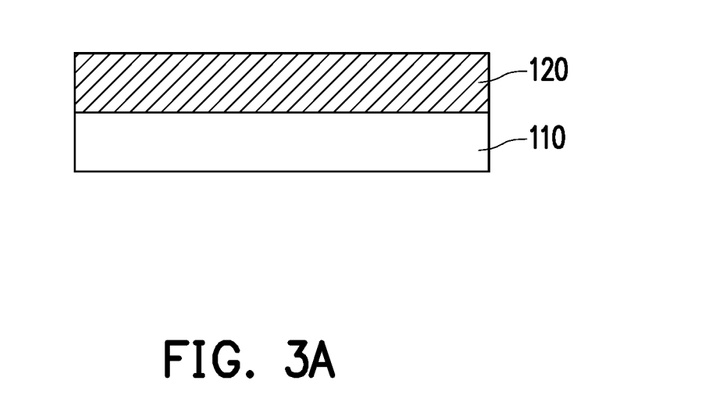
FIG. 3A to FIG. 3D are partial cross-sectional views of a flexible display device at different stages of a manufacturing process according to a yet another embodiment of the disclosure.
Figure 3B:
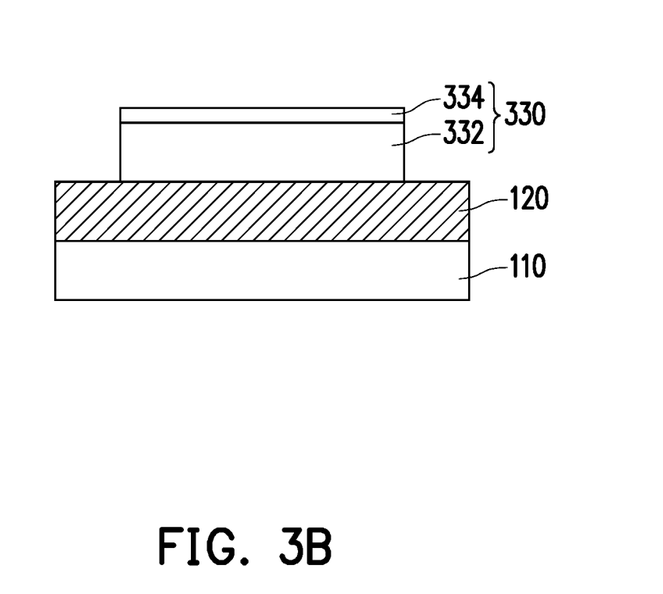
Figure 3C:
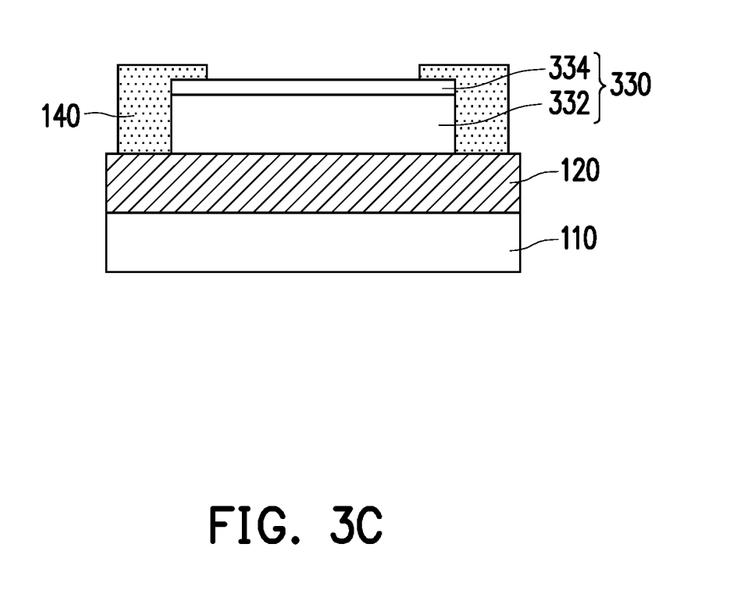
Figure 3D:
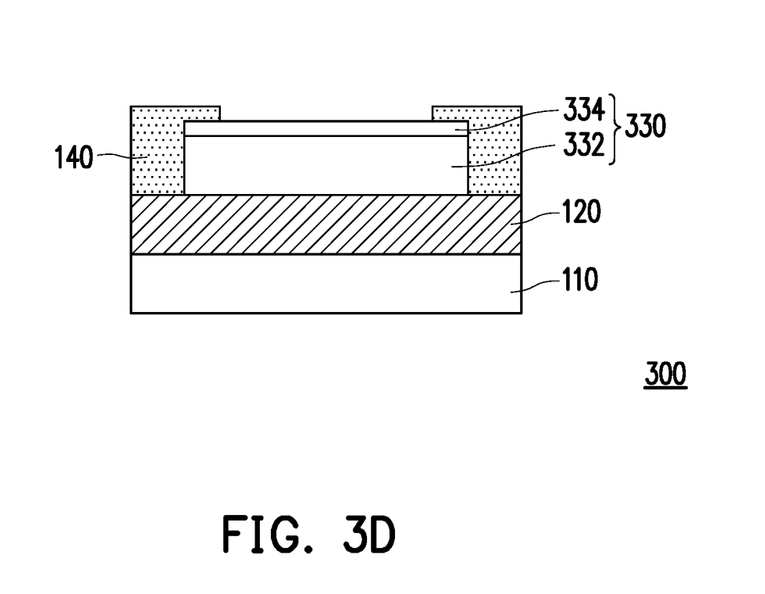

FIG. 2A is a partial top view of a flexible display device according to another embodiment of the disclosure. FIG. 2B is a partial cross-sectional view along a line A-A' in FIG. 2A. FIG. 2C is a partial cross-sectional view along a line B-B' in FIG. 2A. Referring to FIG. 2A to FIG. 2C together, a flexible display device 200 of the present embodiment includes a bendable region 10 and a non-bending region 20 adjacent to the bendable region 10, and the thickness d3 of the adhesive layer 140 in the bendable region 10 is different from a thickness d5 of the adhesive layer 142 in the non-bending region 20. The thickness d3 of the adhesive layer 140 in the bendable region 10 may be less than the thickness d5 of the adhesive layer 142 in the non-bending region 20. Since the thickness d3 of the adhesive layer 140 in the bendable region 10 is smaller, a larger bending space may be provided for the flexible display device 200. Since the thickness d5 of the adhesive layer 142 in the non-bending region 20 is g larger, the flexible display device 200 may be well protected.

FIG. 3A to FIG. 3D are partial cross-sectional views of a flexible display device at different stages of a manufacturing process according to a yet another embodiment of the disclosure. Referring to FIG. 3A to FIG. 3D together, a difference between a flexible display device 300 of the present embodiment and the flexible display device 200 in the embodiment of FIG. 1A to FIG. 1D lies in that: a protective film 330 may be a combination of a plastic material layer 332 and a hard coating layer 334. The plastic material layer 332 may be a transparent plastic material with light penetrability. For example, a material of the plastic material layer 332 may be transparent polyimide (CPI), PET, PEN, or polymethyl methacrylate (PMMA), but the disclosure is not limited thereto. A material of the hard coating layer 334 is, for example, polymerized siloxanes or polysiloxanes that may include organic and inorganic polymers. In an embodiment, a chemical formula is [—R2SiO—]n, where R is an organic functional group of methyl, phenyl, etc. The materials are composed of inorganic siloxane bond skeletons ( . . . —Si—O—Si—O—Si—O— . . . ) and branched organic groups bound to silicon atoms by covalent bonds. For example, by controlling lengths of the skeletons, types of organic groups, and crosslinking of the skeletons, the polymerized siloxanes or polysiloxanes with different properties of organic and inorganic mixtures may be obtained. The higher a proportion of inorganic materials, the more the crosslinking of the skeletons, and the higher the hardness.

It should be noted that in embodiments that are not shown, the protective film may be a combination of an inorganic material layer (e.g., thin glass) and a combination of a plastic material layer (e.g., PI) and a hard coating (e.g., polymerized siloxanes or polysiloxanes). In other words, the protective film may include an inorganic material layer (e.g., thin glass), a plastic material layer (e.g., PI), and a hard coating (e.g., polymerized siloxanes or polysiloxanes) sequentially stacked on the display panel 120.

Figure 4A:
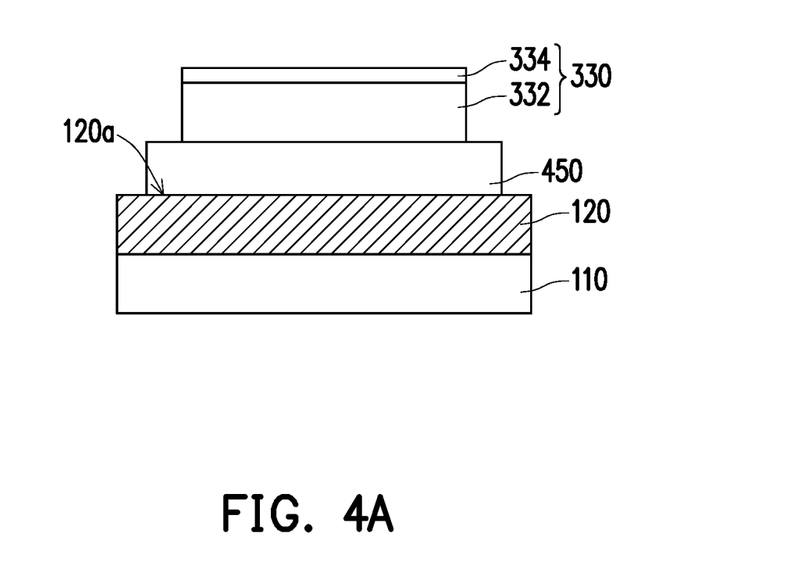
FIG. 4A to FIG. 4C are partial cross-sectional views of a flexible display device at different stages of a manufacturing process according to a still another embodiment of the disclosure.
Figure 4B:
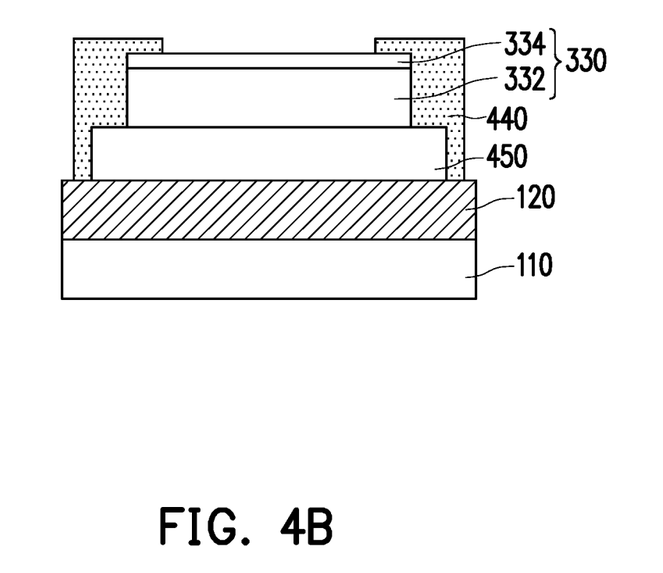
Figure 4C:
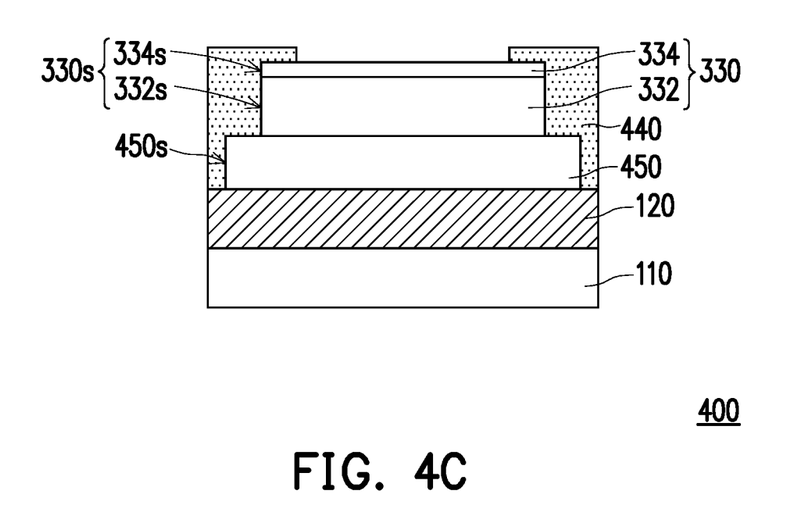

FIG. 4A to FIG. 4C are partial cross-sectional views of a flexible display device at different stages of a manufacturing process according to a still another embodiment of the disclosure. Referring to FIG. 4A and FIG. 4C together, a difference between a flexible display device 400 of the present embodiment and the flexible display device 300 in the embodiment of FIG. 3A to FIG. 3D lies in that: an optical structure layer 450 is formed on the surface 120a of the display panel 120 away from the base film 110 before the protective film 330 is formed. In other words, the optical structure layer 450 is located between the display panel 120 and the protective film 330. An area of the protective film 330 may be less than an area of the optical structure layer 450, and the area of the optical structure layer 450 may be less than the area of the display panel 120. In other words, the optical structure layer 450 is indented towards the display panel 120, and the protective film 330 is indented towards the optical structure layer 450. On the other hand, an adhesive layer 440 of the flexible display device 400 may cover a side edge 450s of the optical structure layer 450 and a side edge 330s of the protective film 330 (a side edge 332s of the plastic material layer 332 and a side edge 334s of the hard coating layer 334).

Based on the above, in the disclosure, thanks to the overlapping portion provided between the adhesive layer and the protective film and the parameter setting of the thickness and the Young's modulus of the adhesive layer, the position of the neural axis of the flexible display device may be dynamically adjusted. Therefore, formation and lengthening of cracks at the edge due to repeated bending are prevented from occurring, adverse effects of a bending stress on the flexible display device are reduced, and the service life of the flexible display device is prolonged.

What is claimed is:

1. A flexible display device, comprising;
a display panel, located on a base film;
a protective film, located on a surface of the display panel away from the base film, wherein an area of the protective film is less than an area of the display panel; and
an adhesive layer, wherein the adhesive layer and the protective film has an overlapping portion, a thickness of the adhesive layer is between 10 μm and 500 μm, a Young's modulus of the adhesive layer is between 0.1 GPa and 10 GPa, and a side edge of the base film, a side edge of the display panel, and a side edge of the adhesive layer are substantially aligned.

2. The flexible display device according to claim 1, wherein a thickness of the protective film is greater than a thickness of the display panel.

3. The flexible display device according to claim 1, wherein surface hardness of the protective film is greater than surface hardness of the display panel and surface hardness of the base film.

4. The flexible display device according to claim 1, wherein the protective film comprises an inorganic material layer, a combination of a plastic material layer and a hard coating, or a combination of the inorganic material layer, the plastic material layer, and the hard coating.

5. The flexible display device according to claim 1, wherein the Young's modulus of the adhesive layer is less than or equal to a Young's modulus of the base film.

6. The flexible display device according to claim 1, wherein the overlapping portion comprises a side edge of the protective film.

7. The flexible display device according to claim 6, wherein a width of the overlapping portion is between 10 μm and 1,000 μm.

8. The flexible display device according to claim 1, wherein a distance between a side edge of the protective film and the side edge of the adhesive layer is between 100 μm and 1,000 μm.

9. The flexible display device according to claim 1, wherein the adhesive layer is a black adhesive layer.

10. The flexible display device according to claim 1, wherein the flexible display device comprises a bendable region and a non-bending region adjacent to the bendable region, and the adhesive layer in the bendable region has a first thickness, the adhesive layer in the non-bending area has a second thickness, and the first thickness is different from the second thickness.

11. The flexible display device according to claim 10, wherein the first thickness of the adhesive layer in the bendable region is less than the second thickness of the adhesive layer in the non-bending region.

12. The flexible display device according to claim 1, further comprising an optical structure layer, located between the display panel and the protective film.

13. The flexible display device according to claim 12, wherein the area of the protective film is less than an area of the optical structure layer, and the area of the optical structure layer is less than the area of the display panel.

14. The flexible display device according to claim 12, wherein the adhesive layer covers a side edge of the optical structure layer and a side edge of the protective film.

15. The flexible display device according to claim 1, wherein the thickness of the adhesive layer is greater than or equal to a thickness of the base film.

16. The flexible display device according to claim 1, wherein a stiffness of the adhesive layer is equal to a stiffness of the base film.

17. The flexible display device according to claim 1, wherein the display panel comprises a flexible lower substrate and a flexible transparent upper substrate, and a stiffness of the flexible lower substrate is substantially equal to a stiffness of the flexible transparent upper substrate.

* * * * *